May 20, 1952  C. HARTER  2,596,997
CUTTING AND FORMING MACHINE
Filed Sept. 21, 1945  6 Sheets-Sheet 1

Inventor:
Clair Harter,
By Christen, Niles, Schroeder
Merriam & Hofgren, Attys.

May 20, 1952 C. HARTER 2,596,997
CUTTING AND FORMING MACHINE
Filed Sept. 21, 1945 6 Sheets-Sheet 2

Inventor.
Clair Harter,
By Christen, Wiley & Schroeder,
Merriam, Hofgren, Attys.

May 20, 1952 C. HARTER 2,596,997
CUTTING AND FORMING MACHINE
Filed Sept. 21, 1945 6 Sheets-Sheet 3
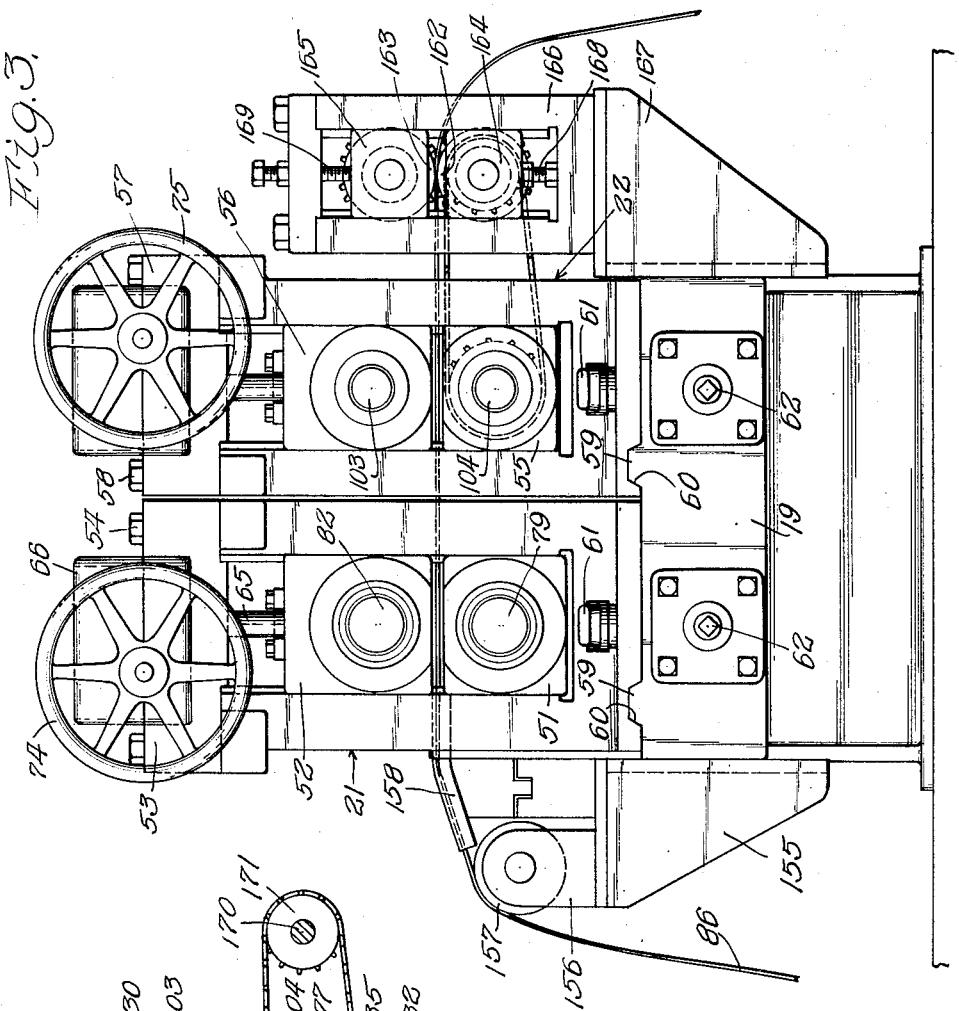

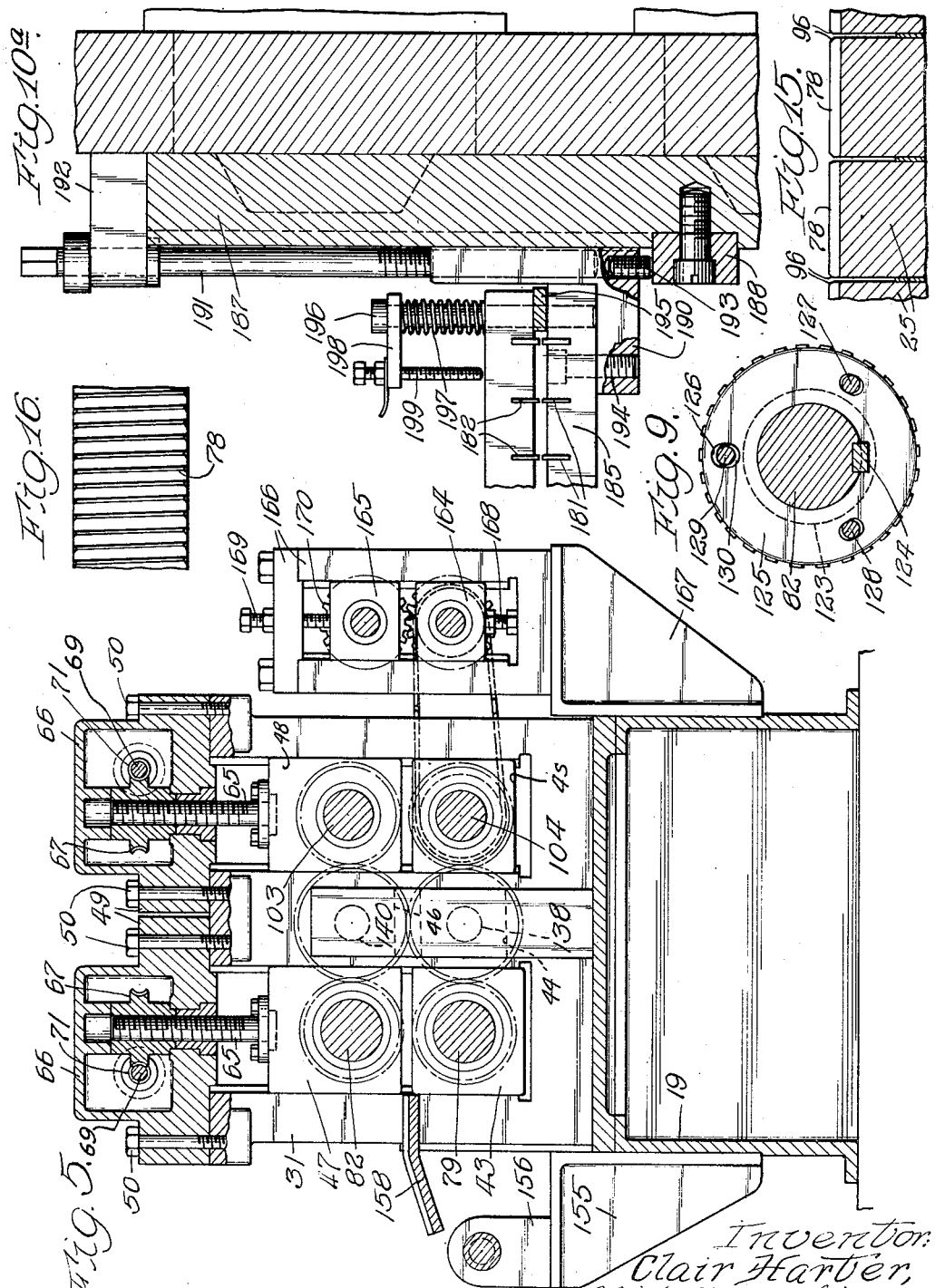

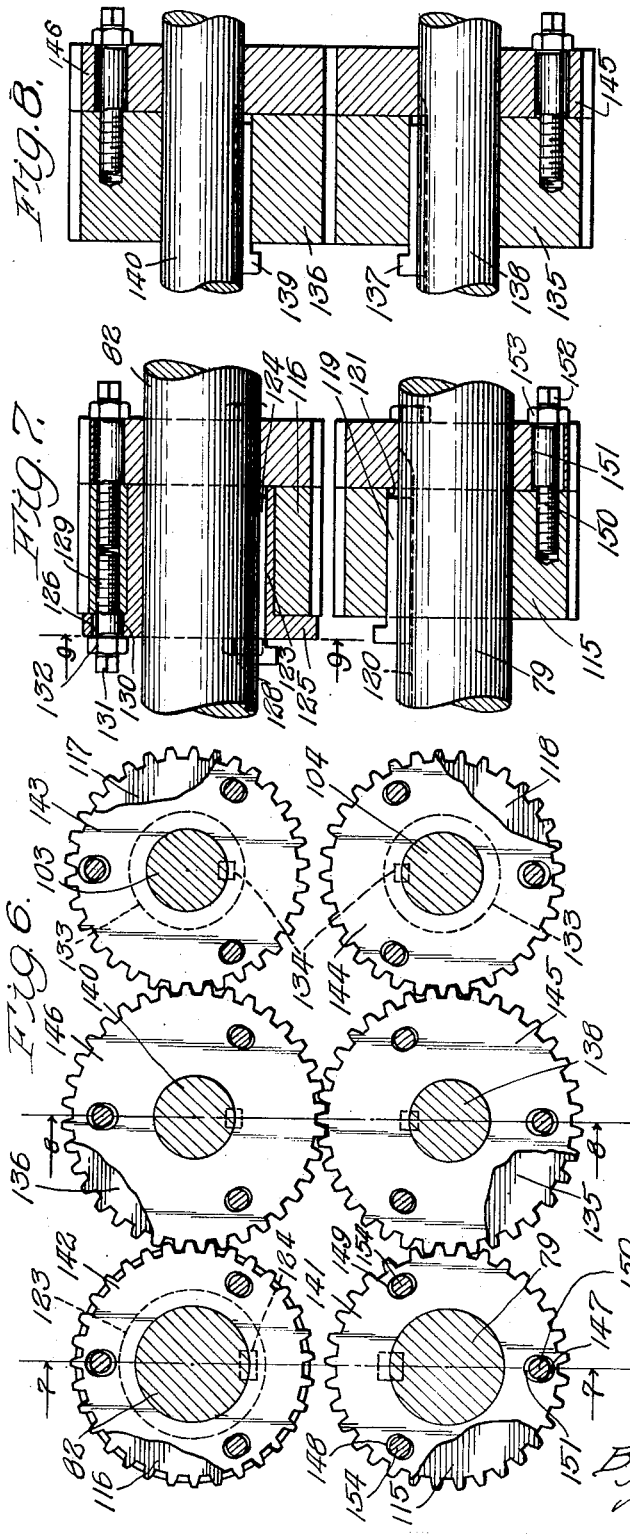
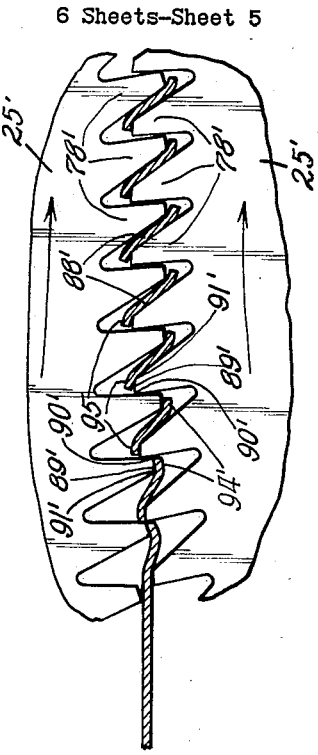
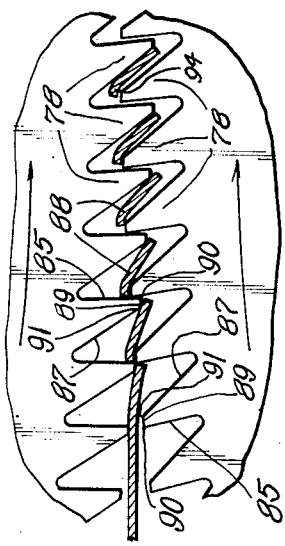

May 20, 1952 C. HARTER 2,596,997
CUTTING AND FORMING MACHINE
Filed Sept. 21, 1945 6 Sheets-Sheet 6
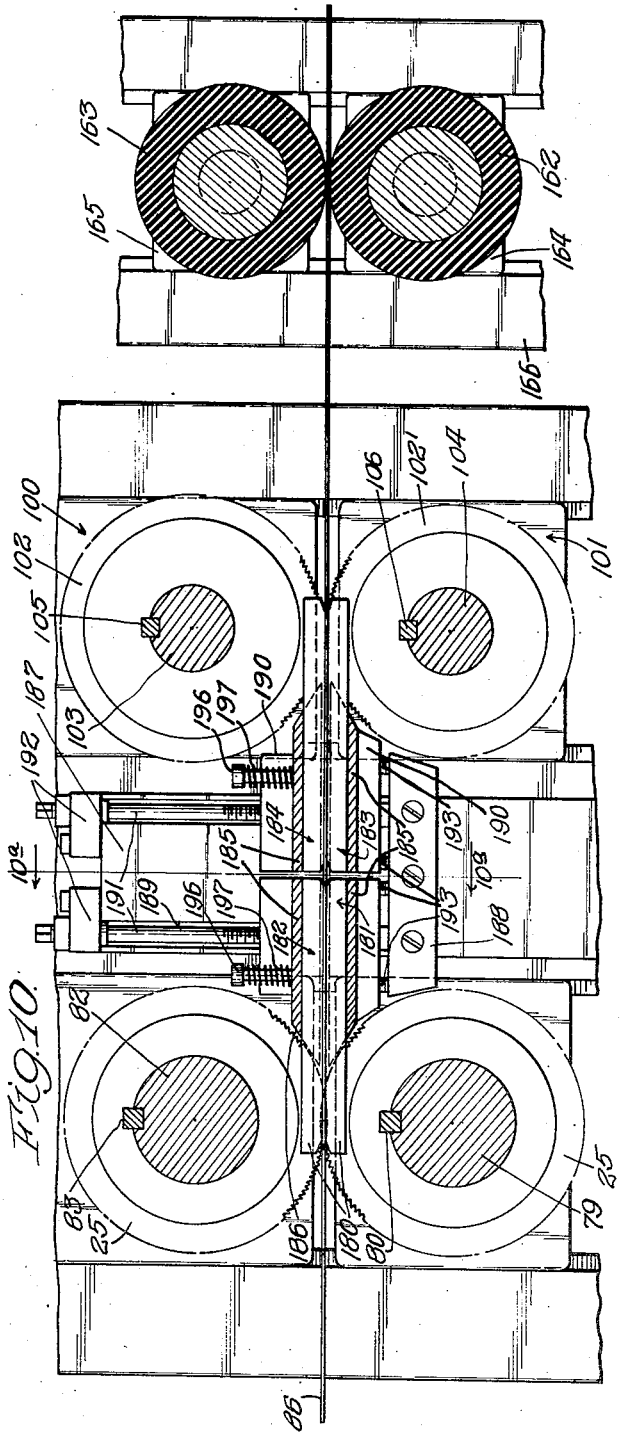
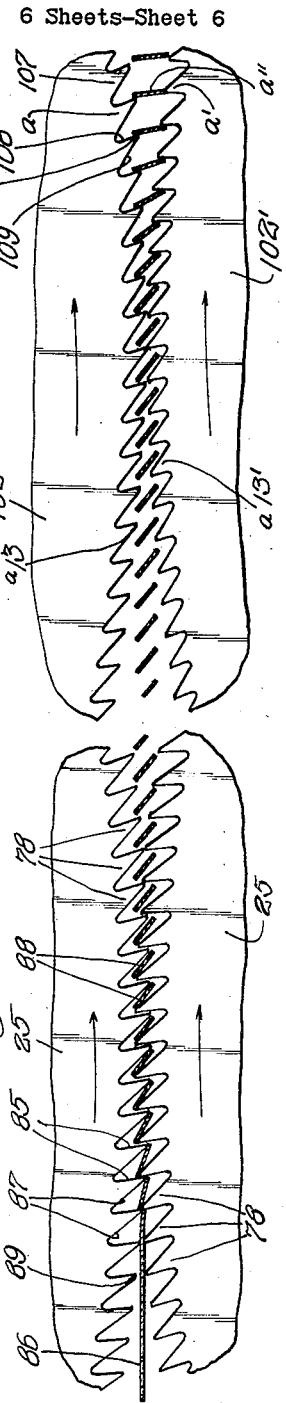
Inventor:
Clair Harter,
By Christy, Wiles, Schroeder
Merriam & Hofgren, Attys.

Patented May 20, 1952

2,596,997

UNITED STATES PATENT OFFICE 2,596,997

CUTTING AND FORMING MACHINE

Clair Harter, Gurnee, Ill., assignor, by mesne assignments, to Flex-O-Glass, Inc., a corporation of Illinois Application September 21, 1945, Serial No. 617,812

28 Claims. (Cl. 153—2)

1

The invention relates generally to a machine for performing various cutting and forming operations upon materials in sheet form and more particularly to a machine for producing screen of the Venetian type from material in sheets.

A general object of the invention is to provide a machine of the character described which is of new and improved construction capable of continuous operation and having a very high production capacity.

A more particular object of the invention is to provide a cutting and forming machine operable to perform its cutting and forming operations upon material in sheet form while the latter is fed continuously and preferably at a uniform rate through the machine.

Another object is to provide a cutting and forming machine having a first means for performing a cutting operation and a second means for performing a forming operation upon a sheet of material fed continuously and at a uniform rate through the machine, the second means being accurately coordinated with the first means and with the cut sheet while having a rate of operation specifically different from both the rate of operation of the first means and the rate of movement of the cut sheet.

Another object is to provide a cutting and forming machine having a first means for performing a cutting operation and a second means for performing a forming operation upon a sheet of material fed continuously and at a uniform rate through the machine, the second means having cooperating parts operating at relatively different rates with at least one part also operating at a rate different from the rate of movement of the cut sheet.

Another object is to provide a machine of the character described which is readily adaptable to operate upon sheets of different width.

Another object is to provide a machine of the character described in which the cutting and forming are done by rotary means.

Yet another object is to provide a cutting and forming machine operable continuously to produce from an imperforate sheet a screen of the Venetian type.

Still another object is to provide a machine which is operable to cut a sheet into longitudinal columns of narrow transversely extending elements, twist the elements out of the plane of the sheet and also give to each element a transverse cross-sectional shape which strengthens the element against bending.

A further object is to provide a machine for

2 producing Venetian type screen from an imperforate sheet having means readily adjustable to vary the twist given to the elements composing the screen and hence the angle of the elements with the plane of the screen.

Yet a further object is to provide in a machine of the character described new and improved means for attaining the precision of adjustment and coordination between the various cutting and forming means necessary to the successful operation of the machine.

Other objects and advantages will become apparent from the following detailed description taken in connection with the accompanying drawings, in which:

Fig. 3 is a side elevational view of the machine of Fig. 1 taken from the right in Fig. 1.

Fig. 4 is a partial longitudinal sectional view taken approximately along the line 4—4 of Fig. 1.

Fig. 5 is a partial longitudinal sectional view taken approximately along the line 5—5 of Fig. 1.

Fig. 6 is an enlarged view of the gearing only taken along the line 6—6 of Fig. 1.

Fig. 7 is a fragmentary sectional view taken along the line 7—7 of Fig. 6.

Fig. 8 is a fragmentary sectional view taken along the line 8—8 of Fig. 6.

Fig. 9 is a fragmentary sectional view taken approximately along the line 9—9 of Fig. 7.

Fig. 10 is an enlarged fragmentary view taken in a vertical plane extending longitudinally of the machine approximately centrally thereof.

Fig. 10a is a fragmentary and enlarged sectional view taken approximately along the line 10a—10a of Fig. 10.

Fig. 11 is a greatly enlarged view of the operating portion of the cutting and partial forming means.

Fig. 12 is a greatly enlarged view of the operating portion of the final forming means.

Fig. 13 is a still further enlarged view of a few teeth of the cutting and partial forming means in operation.

Fig. 14 is a view similar to Fig. 13 but showing a modified tooth structure.

Fig. 15 is a sectional view on the same scale as Fig. 13 of adjacent cutting elements and showing a single tooth in side elevation on each cutting element.

Fig. 16 is a partial view in edge elevation, on approximately the scale of Fig. 11, of a cutting element.

Figure 1:
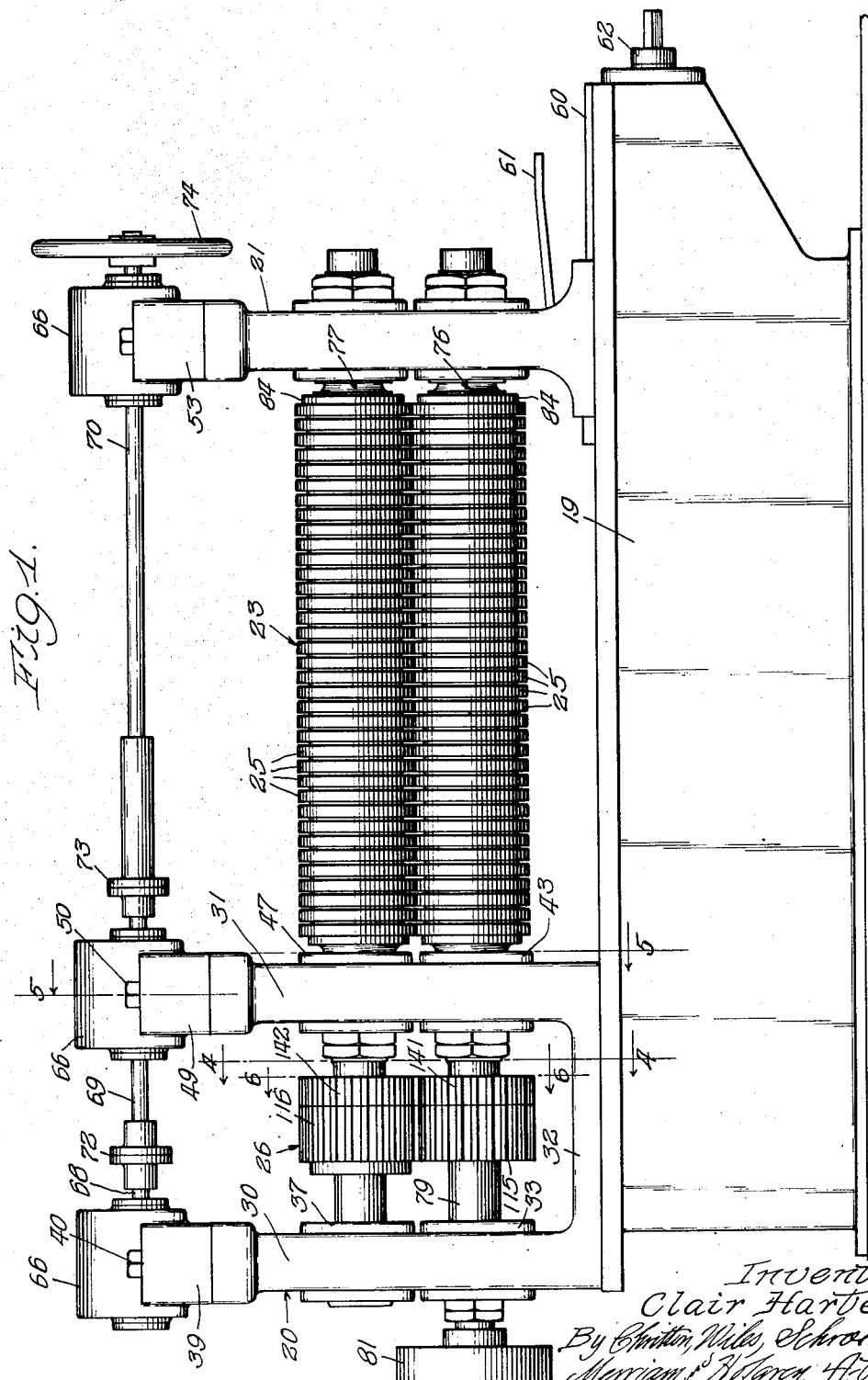
Fig. 1 is a front end elevational view of a machine, a guide roller and an apron being omitted, embodying the features of my invention.

While the invention is susceptible of various modifications and alternative constructions, it is herein shown and will hereinafter be described in a preferred embodiment and, more particularly, an embodiment especially adapted for the production of screen of the Venetian type. It is not intended, however, that the invention is to be limited thereby to the particular embodiment shown. On the contrary, it is intended to cover all modifications and alternative constructions falling within the spirit and scope of the invention as defined in the appended claims.

*The machine and operation generally*

As shown in the drawings for purposes of disclosure, the invention is illustrated as embodied in a cutting and forming machine adapted for the production from a sheet of a mesh fabric and, more particularly, an insect screen fabric which also functions as a Venetian blind. This screen fabric has come to be known and is hereinafter referred to as of the Venetian type. While it is to be understood that a machine embodying the principles of this invention may be employed to produce various types of mesh fabrics from a sheet, the machine as herein disclosed is particularly adapted for the production of Venetian-type screen and particularly, of Venetian-type screen of the character disclosed and claimed in U. S. Letters Patent to Harold Warp No. 2,366,224, issued January 2, 1945, and in the application of Harold Warp Serial No. 572,327, filed January 11, 1945, and issued December 27, 1949, as Patent No. 2,492,909.

It is believed that knowledge of the construction of the screen to be produced by the machine herein disclosed will aid in the appreciation and understanding of this invention. Accordingly, it is pointed out that the screen is composed of a plurality of, what in the mounted position of the screen will be, vertical columns of transversely or horizontally extending elements. These elements are formed from a solid sheet by cutting therein longitudinally extending columns of parallel, transverse slits, the columns being separated by continuous, longitudinally extending, supporting strips to which the elements are attached at their ends. The elements are twisted out of the plane of the screen so as to make a large angle with the plane of the screen, and in that position serve to prevent passage of the direct rays of the sun through the screen during certain critical hours of the day. The elements composing the screen preferably are very narrow, running from twelve to twenty elements per inch so as to prevent the passage of insects therethrough and are preferably one inch in length, measured center to center of the supporting strips. Each element along at least one edge is given a slight bend or lip-like formation so as to strengthen the element. For more detailed information as to the construction of the Venetian screen, reference is made to the above mentioned Warp patents. It is, moreover, to be understood that reference to the above described screen is in aid of a more ready understanding only and that the machine is in no wise limited as to the length or width of element composing the screen.

As shown herein for purposes of disclosure, the machine comprises generally a bed 19. Mounted on the bed 19 at one side thereof is a column 20 and mounted at the other side thereof (see Fig. 3) are a pair of columns 21 and 22. Supported by the columns is a first means, generally designated 23, for performing a sheet-cutting or slitting and, in this instance, also an initial and partial forming function and a second means, generally designated 24 (Fig. 2) performing a further and, in this instance, final forming function. Both the means 23 and 24 are composed of complementary parts which herein are rotary in character and composed of a plurality of toothed elements mounted on shafts journaled in the columns 20, 21 and 22. Gearing, generally designated 26, drives the cutting and forming means in precisely timed and coordinated relationship but with the complementary parts constituting the forming means 24 driven to have relatively different peripheral speeds and peripheral speeds different from that of the means 23, and hence also different from the rate of feed of the sheet material through the machine. Also driven through the gearing is a finished product take-off means, generally designated 27.

In the operation of the machine, a roll of the sheet material from which the screen is to be formed is rotatably supported, by means not here shown, at the front of the machine. The sheet of material is fed to the cutting and forming means 23 where the plurality of toothed elements, designed to act as cutters and formers, cut the sheet into longitudinal columns of narrow, transversely extending louver elements with the columns separated by narrow, continuous, longitudinally extending strips which form the supports for the louver elements. As an incident to the cutting, the toothed elements of the means 23 also effect a partial twisting of the louver elements out of the plane of the sheet about the center line of each element and further deform the elements in transverse cross section to provide the lip-like strengthening flange or offset. The sheet thus severed and with the narrow louver elements partially twisted is next fed to the final forming means 24 whose toothed elements engage the partially twisted louver elements of the sheet and impart thereto the final twist necessary to have the louver elements disposed at the proper angle to the plane of the sheet. From the forming means 24 the now completely formed screen passes through the take-off means 27 and thence onto a power driven winding means (not here shown) disposed at the back of the machine. The take-off means 27 serves to maintain a certain pull on the sheet, but does not affect the rate of movement of the material through the machine which is determined entirely by the rate of operation of the cutting and forming means 23. It will be seen from the foregoing that the material will be fed through the machine at a continuous and uniform rate and that the machine thus will have a very high productive capacity.

The manner in which the means 24 is accurately and precisely coordinated with the means 23 and with the movement of the partially formed screen through the machine, so as to enable it to perform the functions assigned to it, will all be made apparent as the detailed description of the machine and its operation proceeds. Likewise, the more detailed description will disclose the various adjustments that may be made whereby the machine is adapted to produce screen of different widths, or with the louver elements forming various angles with the plane of the screen, or with the louver elements of various lengths, or with the louver elements in adjacent columns directly opposite or offset varying amounts.

The machine frame

The machine frame, as already stated, comprises a bed or base 19 which is wider than long. At one side there is fixedly supported on the bed 19 the column 20 which, as viewed from the front of the machine, that is, as viewed in Fig. 1, is of U-shaped formation composed of a pair of uprights 30 and 31 forming the legs of the U and an interconnecting base portion 32. As seen in Fig. 4, the lower half of the upright 30 is formed with three stationary bearings 33, 34 and 35. Above the bearing 34 the upright 30 has formed therein another stationary bearing 36, while the portions of the upright 30 directly above the bearings 33 and 35 are formed with upwardly opening recesses for the reception therein of vertically slidable bearings 37 and 38. The member 30 and the bearings 37 and 38 are, of course, formed with suitable cooperating slideways to permit such vertical movement of the bearings 37 and 38. The upright 30 is completed by a horizontally extending cross bar 39 removably secured as by bolts 40 over the top of the upright 30. The upright 31 is of the same construction as the upright 30. Suffice it to say, therefore, that it has formed therein four stationary bearings 43, 44, 45 and 46, and two vertically movable bearings 47 and 48 (see Fig. 5). A cross bar 49 completes the upright 31 and is again removably secured to the top thereof as by bolts 50.

The columns 21 and 22 upstanding from the opposite side of the bed 19 are independent of one another but are of identical construction. In the lower half of the column 21 (see Fig. 3) there is carried a stationary bearing 51, while the upper half is formed with an upwardly opening recess for the reception therein of a vertically slidable bearing 52. The column is completed by a horizontal cross bar 53 removably secured as by bolts 54 to form the very top of the column and close the recess in which the slidable bearing 52 is received. The column and the bearing are, of course, formed with cooperating slideways to retain the bearing while permitting this vertical movement. Column 22 similarly carries a stationary bearing 55 and a vertically movable bearing 56, and is completed by a cross bar 57 removably secured as by bolts 58.

For purposes which will hereinafter become more apparent, the columns 21 and 22 are mounted for movement transversely of the bed 19. To that end each of the columns 21 and 22 at its base is formed with a groove 59 for cooperation with a way 60 extending transversely of the bed 19. Each of the columns is also provided with conventional means for clamping the same rigidly in adjusted position. The actuating lever for such clamping means is shown at 61 in Fig. 3. The columns are moved transversely of the bed, when the clamping means is released, by means of a screw device 62 extending transversely of the bed 19 and engaging suitable and conventional cooperating means depending from the columns.

Movable bearing actuating mechanism

As will later become more apparent, it is not only desirable but essential that the related movable bearings, such as 37—47—52, and 38—48—56 be at all times accurately aligned, and it is also frequently necessary that they be adjusted vertically simultaneously. To that end, means is provided whereby the operator of the machine may readily and conveniently adjust all three of a series of bearings simultaneously and by the same amount. Accordingly, each bearing 37, 47 and 52 has extending upwardly therefrom a threaded, nonrotatable screw 65 which projects through the cross bars 39, 49 and 53, respectively, into similar housings 66 formed on the cross bars. Threadedly engaging each screw 65 is a worm wheel 67 mounted in well known manner to be rotatable but fixed against axial movement so as to impart longitudinal movement to the screw as the worm wheel is rotated in one direction or the other relative to the screw. Journaled in the housings 66 formed on the cross bars 39, 49 and 53, respectively, are shafts 68, 69 and 70 each extending transversely of the bed and all in axial alignment. Each, moreover, has nonrotatably fixed thereon a worm 71 meshing with a worm wheel 67. Shafts 68 and 69 are united by means of a coupling 72 and shafts 69 and 70 are united by means of a coupling 73 which is of the telescoping type permitting the shaft 70 to move axially relative to the coupling without becoming disengaged. The remaining end of the shaft 70 projects through and beyond the housing 66 on the cross bar 53 and carries a handwheel 74 for manual rotation of the shaft 70 and, of course, through the mechanism just described adjustment of all of the bearings 37, 47 and 52. Identical mechanism is provided for adjustment of the bearings 38, 48 and 56. Suffice it to say, therefore, that a handwheel 75 is provided for effecting adjustment of the movable bearings 38, 48 and 56.

Cutting and partial forming means

Inasmuch as it is one of the primary objects of this invention to provide a machine for producing a mesh fabric from a solid sheet of material while employing all of the sheet, the means 23 is provided herein for cutting or slitting the sheet so as to produce the desired elements. Such means has complementary parts 76 and 77 (see Fig. 1) adapted to engage opposite sides of a sheet of material to be cut and formed. The specific form of the means 23 and its parts will, of course, vary depending upon the nature of the finished product. With the end product here sought being a screen of the Venetian type and, more particularly, a screen such as disclosed and claimed in the Warp U. S. Letters Patent No. 2,366,224 and the Warp application Serial No. 572,237, filed January 11, 1945, and issued December 27, 1949, as Patent No. 2,492,909, the means 23 is adapted to cut longitudinal columns of transversely extending slits with the columns of slits separated by narrow, continuous, longitudinally extending strips constituting the supporting means for the narrow louver elements formed by the slitting, and to which the elements are secured by attachment at their ends only. Herein both the part 76 and the part 77 of the means 23 are composed and built up of a plurality of similar elements 25, each adapted to cooperate in the cutting of one of the longitudinal columns of slits, with the elements 25 so spaced transversely of the machine as to leave the continuous supporting strips of desired width. This spacing may be effected by means formed directly on the elements 25 or by separate spacers. With this construction, the means 23 can by addition or removal of one or more elements 25 be readily expanded or contracted so as to operate upon sheets of material of varying width, while still leaving a side edge margin of uniform width on both sides of the sheet. This construction also permits of ready varying of the width of the supporting strip separating the columns of slits and the resultant louver elements simply by varying the spacing between adjacent cutting elements 25. Moreover, the width of the columns, that is, the length of the louver elements, may be varied by changing the width of the cutting elements 25.

For large productive capacity of the machine and as one exemplary embodiment, this means 23 herein takes the form of rotary means. The individual cutting elements 25 composing the means 23 thus take the form of disk or gear-like elements formed with teeth 78 around their peripheries (see Figs. 11 and 13). The elements 25 composing the lower part 76 of the means 23 are mounted on a shaft 79 and are nonrotatably held and accurately aligned by means of a key 80 inserted into a keyway formed partially in the elements and partially in the shaft 79. This shaft is journalled at one end in the bearing 51 and at its other end projects first through and is journaled in the bearing 43, and then projects through and is journaled in the bearing 33. The shaft 79 constitutes the main drive shaft of the machine and to that end has nonrotatably secured to the end projecting beyond the bearing 33 a pulley or coupling 81 (Fig. 1) for the reception of power from a suitable source (not here shown). The cutting elements 25 composing the part 77 of the means 23 are mounted on a shaft 82 and are held nonrotatable relatively to the shaft and in accurate alignment by means of a key 83 received in a keyway formed partially in the elements 25 and partially in the shaft 82. This shaft 82 is journaled at one end in the movable bearing 52 and at the other end is first journaled in and projects through the bearing 47 and then is journaled in the bearing 37, both of which, like the bearing 52, are movable as was previously described. It will be understood that the elements 25 on shaft 82 are also in alignment with the elements on shaft 79, the elements operating in pairs.

Each shaft 79 and 82, as viewed in Fig. 1, is threaded at its right-hand end to receive a nut 84 for retaining the elements 25. These threads extend inwardly just far enough so that the nut 84 can tightly secure the elements 25 when a full complement of elements is on the shaft. The shafts are here shown as accommodating a maximum of thirty-six elements 25 adapting the machine to work upon a sheet a yard wide. By substituting spacer blanks for the elements 25 the nut 84 will still secure the elements 25 regardless of the number that have been removed, thereby adapting the machine to produce screen ranging in width from thirty-six inches to one inch, which is more than the normal range of window widths. The cutting elements 25 are removed or applied over the right-hand end of the shafts 79 and 82, as viewed in Fig. 1, by withdrawing the shafts from the bearings 51 and 52 by lateral outward movement of the column 21 through the medium of the screw device 62.

As best seen in Figs. 11 and 13, which as successively enlarged showings of the intermeshing portions of a cooperating pair of the cutting elements 25, the elements have, as shown in those views, identical tooth structures and circular pitch but the elements are reversed so that what is the leading edge of the teeth in the upper element 25 is the trailing edge of the teeth in the lower element 25. The elements, moreover, are of the same diameter (see Fig. 10). This has the advantage that all of the elements 25 may be cut and ground at the same time, so as to assure uniformity and precision, and then half of the elements are simply mounted so that the faces are reversed, as above stated. The specific tooth structure may vary within limits dictated in part by the necessity for clearance, and in part by the transverse cross sectional shape of the louver element desired. Herein the cutting edge face 85 of each tooth has a rake or undercut such that the face is a few degrees off of a true radial. More specifically, the undercut is such that on that one of the elements 25 on which the face 85 is the leading face, in Figs. 11 and 13 the upper element, the face is approximately perpendicular to a sheet of material 86 at the time of contact with the sheet of material. The angle which the backing face 87 makes with the face 85 of the following tooth, as herein shown, is about 40° and is again determined by questions of clearance and tooth strength. For added strength, adjacent faces 85 and 87 do not intersect at their root portions in an acute angle but are joined by a radius.

Herein the elements 25 are not only employed as slitting means, but also as partial forming, herein twisting, means for the louvered elements 88 which are formed by the slitting operation. To that end, the teeth of the elements 25 must intermesh to a greater extent than would be necessary for mere slitting of the sheet. The extent of such intermeshing is readily varied by raising or lowering the shaft 82 through the medium of the movable bearing actuating means above described. In order that the twist imparted to the louver elements 88 by the cutting elements 25 may be a maximum, the elements 25 are in Fig. 13 shown positioned to intermesh the maximum amount possible, again consistent with the strength of the teeth. All of the above factors, therefore, will enter into the angles which the cutting edge face and backing face of the teeth 78 will have to have to provide the necessary clearance and at the same time have the necessary strength.

For purposes of strength and also of obtaining a louver element 88 of such transverse cross section that the louver element is strengthened against bending, the teeth 78 are ground to have a peripheral face 89 of measurable peripheral width. Due to this face 89 of measurable width, two edges rather than a single edge are formed. One edge 90 is formed by juncture of the face 85 with the face 89 and constitutes the cutting edge. Another edge 91 is formed by juncture of the face 87 with the face 89 and constitutes a deforming edge. The face 89, moreover, recedes inwardly progressively from the cutting edge face 85 to the backing face 87 of the tooth. The rake of the peripheral face of the tooth is, of course, very slight, but, dependent upon it and upon the width of the face 89 is the transverse cross sectional shape of the louver element 88.

The above can best be understood from a consideration of Fig. 13. If it is borne in mind that the rake of the peripheral face 89, speaking now of the teeth of the upper one of the elements 25 shown in Fig. 13, is inwardly from what in that element is the leading to the lagging face of the tooth and that the leading face 85 is substantially perpendicular to the sheet of material 86 at the time the tooth first makes contact with the sheet, it will be readily apparent that the cutting edge 90 of the tooth will be the first to contact the sheet and only after the sheet has been partially cut will the deforming edge 91 contact the sheet. In contrast, the tooth of the lower one of the elements 25 in Fig. 13, being reversed as it is, despite the rake of the surface 89, will engage the sheet 86 first with the edge 91, which is the deforming edge. The cutting edge 90 of the tooth 78 of the lower element will come into operation only after further intermeshing of the cutting elements and specifically after the louver element 88 has been bent slightly over the edge 91 to form the flange or lip 94. Thus, the width of the peripheral face 89 will determine the width of the lip or flange 94 formed on the louver element 88, and the rake will determine the angle of that flange relative to the balance of the louver element. Because the tooth of the upper one of the elements 25 in Fig. 13 initially contacts the sheet 86 with its cutting edge 90, there is not this same tendency toward deformation of the leading edge of a louver element 88 for the edge 91 contacts the material after it has already been at least partially, if not fully, slit and thus is more yieldable, whereas the edge 91 of the tooth on the lower element 25 contacts the sheet and, more particularly, a louver element 88 while it is still integral with the sheet at its trailing edge and thus more rigid, and, further, while it is backed up by the tooth of the upper one of the cutting elements. The amount of deformation thus given to the leading edge of a louver element is less under this particular formation of teeth than the deformation given to the trailing edge and may even be so slight as not to be noticeable.

As the upper and lower elements 25 (Figs. 11 and 13) continue to rotate in a counterclockwise and a clockwise direction, respectively, and thus intermesh to a progressively greater extent as the teeth progress from first contact with the sheet 86 to a line through the centers of the cutting elements 25, the backing face 87 of the tooth of the upper cutter element will force the leading edge of the louver element 88 downwardly while the backing face of the tooth of the lower cutter element will force the trailing edge of the louver element 88 upwardly with the combined action, thus imparting a partial twist to the louver element about its longitudinal center line. As the cooperating teeth pass beyond the center line through the centers of the cutting elements, the teeth simply disengage from the then partially twisted louver elements 88.

Where, as shown in Figs. 11 and 13, the upper and lower cutting elements have identical tooth structure and where, as here, they are of the same size, they will be driven at the same angular speed so as to have the same peripheral speed, which speed incidentally is the rate of feed movement of the sheet 86. It is not necessary, however, that the upper and lower elements 25 be of the same size; they may, if desired, be of different size but driven at different angular speeds so as to have the same peripheral speed but, of course, the pitch of the teeth must be the same.

In Fig. 14 there is disclosed a pair of cutting elements 25' which have a tooth structure modified with respect to that shown in Fig. 13 and in which the tooth structure of the upper cutting element 25', moreover, differs from the tooth structure of the lower cutting element. The lower element 25' is the same as the lower element 25 in Fig. 13, save that the peripheral face 89' is wider and thus the teeth of this cutting element form a wider lip or flange 94' on the louver elements 88'. The upper one of the elements 25' has this same increased width of peripheral face. Whereas, however, the face 89' of the teeth of the lower cutting element still has a rake the same as the lower cutting element 25 of Fig. 13, the face 89' of the teeth of the upper cutting element 25' has a rake opposite from that of the corresponding element in Fig. 13, that is, it has a rake causing the face 89' to slope outwardly from the leading to the trailing face of the tooth. This rake is here made large enough so that the first contact of the tooth with the sheet 86' is by the trailing edge 91' as distinguished from the cutting and herein leading edge 90'. The teeth, when thus shaped, will have the same effect as the teeth on the lower cutter and thus will give to the leading edge of each louver element 88' the same deformation as is given to the trailing edge and the louver elements 88 will thus have the lip or flange 94' on the leading edge and a corresponding lip or flange 95 on the trailing edge. It is to be noted that here, as well as with the tooth formation of Fig. 13, the twisting of the louvers is accomplished primarily by the deforming edges of the teeth and the adjacent backing faces 87, thereby reducing wear on the cutting edge.

If the cutting elements 25 mounted on the shafts 79 or 82 have their teeth aligned longitudinally of this shaft, the slits of one column will be aligned with the slits of adjacent columns. Under those circumstances it is desirable that the ends of the teeth be very slightly beveled, as shown at 96 in Fig. 15. This will leave a small amount of uncut material in addition to the dividing and supporting strip which will absorb the slight tearing at the ends of each slit which takes place as the louver element 88 is twisted. The desired width of supporting strip dividing the columns of elements is thus maintained. By offsetting alternate elements 25 forming the upper part and the lower part of the cutting means 23 by one-half tooth, the slits in adjacent columns will, of course, be staggered by one-half the width of a louver element. With this arrangement, the supporting strip can be made narrower because any tearing resulting from twisting of the louver elements will also be staggered and thus will not tend to run together and thus completely sever the support or reduce it to such thickness as to materially weaken the screen. With proper material, that is, material which is ductile enough to permit of some stretching at the ends where the louver elements are attached, tearing is insignificant.

To facilitate cutting of the sheet, the teeth 78 of each element 25 may be disposed at a very slight angle to an exact transverse of the element as shown in Fig. 16. When so disposed, the teeth of cooperating elements do not engage the sheet simultaneously throughout the width of the elements but engage the sheet progressively from one side to the other of the elements. Thus the teeth, instead of cutting the slit by a punching action, cut it by a scissors-like action with resultant materially less strain on the machine.

*Final forming means*

The final forming means 24, like the cutting and partial forming means 23, is composed of complementary parts 100 and 101 (see Fig. 10) cooperating to engage the partially twisted louver elements 88 and impart the balance of the twist necessary to give the louver elements 88 their final position, which herein is substantially at right angles to the plane of the sheet 86. This final twisting of the louver elements 88 is herein accomplished while the sheet continues to move at a uniform rate through the machine by causing one of the parts, herein the upper part 100, to have a longitudinal movement slightly faster than the rate of movement of the sheet, and causing the other, herein the lower part 101, to have a longitudinal movement the same as or slightly slower than that of the sheet. For uniform twisting of the louver elements 88, the amount by which the rate of movement of the upper part 100 exceeds the rate of movement of the sheet should be equal to the amount by which the movement of the lower part 101 is less than the rate of movement of the sheet. The amount of twist and the final position of the louver elements will, of course, depend upon these relative speeds of the parts 100 and 101, the length of time that the forming means engage a louver element, and the relative position of the parts of the forming means with respect to the axis of the louver elements at the time of disengagement.

As an exemplary disclosure of a way to obtain the above described relative movements, the complementary parts of the means 24 are herein, like the means 23, shown to be rotary in character. The parts 100 and 101, moreover, are again composed of a plurality of disk or gear-like elements 102 and 102', respectively. The series of elements 102 is mounted on a shaft 103 to form the upper part 100 of the means 24. This shaft is journaled at one end in the adjustable bearing 56 and near the other end passes through the adjustable bearing 48 and terminates and is journaled in the adjustable bearing 38. The series of elements 102' is mounted on a shaft 104 to form the lower part 101 of the means 24. This shaft is journaled at one end in the stationary bearing 55 and at the other end first passes through and is journaled in the stationary bearing 45, and then terminates in and is journaled in the bearing 35. The forming elements 102 are nonrotatably secured and properly aligned on the shaft 103 by means of a key 105 received in a keyway formed partially in the shaft 103 and partially in the elements 102. Similarly, the elements 102' mounted on the shaft 104 are nonrotatably secured and properly aligned by means of a key 106 received in a keyway formed partially in the shaft and partially in the elements. The elements 102 are given the same spacing as the elements 25 of the means 23 and, of course, like the elements 25 are removable from the shafts 103 and 104 so as to make the means 24 adaptable for use on sheets 86 of varying width.

In order that the elements 102 and 102' be capable of engaging the louver elements 88 as the partially formed screen fabric passes between the parts 100 and 101, the elements are formed with teeth 107 having a width approximately equal to the length of the louver elements 88 and are otherwise generally formed similar to the teeth 78 of the elements 25. Suffice it to say, therefore, that each tooth has a straight face 108 which is approximately but not quite truly radial, an inclined or backing face 109 which forms an angle of approximately 40° with the straight face of the adjacent tooth, and a peripheral face 110. Inasmuch as the teeth of the elements 102 and 102' do not intermesh, as will presently be more specifically stated, the question of clearance is not present and thus the angles of the various faces is not as critical as in the case of the elements 25.

As already stated, the part 100, more specifically the teeth of the elements 102, has a greater peripheral or linear speed than the sheet 86, and the part 101, more specifically the teeth of the elements 102', has a correspondingly smaller peripheral or linear speed than the sheet 86. In order that the forming elements 102 and 102', under these conditions, be capable of intermeshing properly with each successive element 88 of the the sheet, the circular pitch of the teeth of the forming elements 102 must be greater than the spacing or pitch of the louver elements formed in the sheet, while the circular pitch of the teeth on the elements 102' must be less than the spacing or pitch of the louver elements formed in the sheet. Hence the circular pitch of the teeth of the elements 102 is greater, while the circular pitch of the teeth of the elements 102' is smaller, than the circular pitch of the teeth of the elements 25 which latter elements determine the spacing and hence the pitch of the louver elements of the sheet. The lower limit for the circular pitch of the teeth of the elements 102 thus is something greater than the pitch or spacing of the louver elements 88. The actual circular pitch of the teeth on the elements 102 will, of course, be dependent upon a variety of factors, including the angle through which the louver elements 88 of the sheet are to be twisted, the diameter of the elements 102, the speed at which they are rotated, and the spacing of the elements 102 and 102' measured on a line through their axes. Conversely, the upper limit of the circular pitch of the teeth on the elements 102' is something less than the pitch of the louver elements 88, with the actual pitch being determined by the same factors pointed out in connection with the elements 102. Whatever the upper limit and the lower limit of circular pitch for the teeth of the elements 102 and 102', respectively, may be theoretically, practical considerations dictate a limit not too greatly different from the pitch of the elements of the screen fabric.

Practical considerations also dictate that the elements 102 and 102' be of reasonable size for the fabric to be acted upon, neither of such large diameter as to be cumbersome, nor of such small diameter as to require excessively high angular speeds of rotation. A practical factor which greatly simplifies the machine is to give the forming elements 102 and 102' the same angular speeds of rotation as the elements 25. With such uniform angular speeds of rotation, the difference in peripheral speeds will be accomplished by making the forming elements of appropriately different diameters. This means that herein the elements 102 have the larger, and the elements 102' have the smaller, diameter. This has the advantage that there will be a reasonable number of teeth meshing with the fabric despite the variations in the other conditions that affect the number of teeth so meshing with the fabric and, of course, the greater the number of teeth meshing with the fabric, the more accurately will it be held and formed. In the final analysis, the circular pitch of the teeth of the elements 102 and 102' must be such that one tooth of each of the elements will enter the fabric to mesh with each louver element of the fabric and remain meshed with the fabric and with the louver element with which the intermeshing is initially made until the element has been twisted to its desired angle relative to the plane of the sheet.

By way of example, but not of limitation, reference is made to Fig. 12. In Fig. 12, a and a' represent teeth on the elements 102 and 102', respectively, which are just in the act of disengaging from a louver element a″ which has been twisted to the desired angle, herein a few degrees short of a perpendicular to the plane of the sheet. The teeth a13 and a13′, respectively, represent the position of the teeth a and a′ at the time of intermeshing with the fabric. By intermeshing is here meant penetration by the teeth of the surfaces formed by joining the edges of the partially twisted louver elements 88, and not actual contact of the teeth with the louver elements. It is to be appreciated that these surfaces initially will be parallel planes but, once the teeth engage and commence twisting the louver elements, this surface does not remain a plane but becomes curved, with the two surfaces diverging from one another. The tooth of the element 102 must, of course, always intermesh with the fabric lagging the element which it is to twist, while the tooth of the element 102′ must intermesh with the fabric leading the element which it is to twist. With the particular diameters and circular pitches here illustrated, the teeth of the elements 102 at the time of intermeshing with the fabric lag the fabric by something in excess of one-half pitch of the fabric and, correspondingly, the teeth of the elements 102′ lead the fabric by an excess of one-half pitch. This, of course, will vary with the amount of rotation which is to be given to the louver elements and the separation of the elements 102 and 102′.

Preferably the series of elements 102 and the series of elements 102′ are monuted so that the teeth just clear, as is best seen in Fig. 12. This results in the teeth of the elements being in contact with the louver elements of the fabric a maximum period of time and, of course, also means that, for forming elements of a given circular pitch, a maximum number of teeth are in engagement with the louver elements 88 of the fabric at any one time, and thus serve to hold the fabric more accurately in position. The series of elements 102 and 102′ may, however, be spaced various distances from one another and such spacing utilized to determine the extent of twist given to the louver elements 88. Thus it is believed readily apparent, from Fig. 12, that should the elements 102 and 102′ be spaced a greater distance than the bare clearance shown in Fig. 12, but with the other adjustments maintained the same, the teeth of the forming elements would necessarily become disengaged from the louver elements sooner and, becoming disengaged sooner, would not give as much twist to the louver elements as is given in Fig. 12. The extent to which such lateral adjustment of the axes of the elements 102 and 102′ may be utilized to determine the extent of twist given the louver elements 88 will, of course, be limited to the point where they continue to engage the louver elements in the first instance. This, in turn, will depend upon the extent of twist given to the elements 88 by the initial cutting and partial forming means 23. The vertical adjustment of the shaft 103 to effect the spacing of the parts 100 and 101, as described, is readily accomplished through the adjustable bearing actuating means above described.

It will also be apparent that the angle to which the louver elements 88 are twisted will be dependent upon and controlled by the relative position of the teeth of the elements 102 and 102′ at the time of disengagement of those elements from a louver element. For example, if the elements 102 and 102′ were so adjusted that the teeth a and a′ at the time of disengagement, instead of being substantially opposite one another, as in Fig. 12, a condition required to obtain a substantial 90° disposition of the louver elements relative to the sheet, were to be so adjusted that the tooth a lagged the louver element and the tooth a′ led the louver element to a greater extent than shown in Fig. 12, obviously the louver would not be twisted so far and thus would form a smaller angle with the plane of the sheet. This mode of obtaining a desired angular position of the louver elements is preferable to that of separating the elements 102 and 102′, as above described, and means for effecting this angular adjustment of the elements 102 relative to the elements 102′ will be described hereinafter.

*Drive gearing*

As already stated, the shafts 103 and 104 are, for convenience, driven at the same angular rate of rotation. These shafts are, moreover, driven at the same rate of angular rotation as are the shafts 79 and 82 of the cutting means 23. To that end, there is nonrotatably mounted on the shaft 79, which herein constitutes the main drive shaft, a gear 115, and nonrotatably mounted on each of the shafts 82, 103 and 104 are similar gears 116, 117 and 118, respectively, none of which is in mesh with any other one of the gears so far named. The gear 115, as best seen in Fig. 7, is mounted directly on the shaft 79 and is nonrotatably secured thereto by means of a key 119 which engages partially in a keyway 120 formed in the shaft, and partially in a keyway 121 formed in the gear.

Gears 116, 117 and 118, however, are mounted so as to have limited angular adjustment relative to the shafts 82, 103 and 104, respectively. To that end, there is mounted on the shaft 82 a sleeve 123 nonrotatably secured by means of a key 124 in conventional manner. The sleeve 123 has at one end a radially extending flange 125 which, as best seen in Fig. 9, is formed with one slightly elongated slot 126 which is radially disposed, and two elongated slots 127 spacer 120° from the slot 126, but with the major axis of the slots lying tangential to a circle drawn through the midpoint of the slots 127 and the slot 126, as distinguished from a radial disposition of the major axis as in the case of the slot 126. Extending through the slots 127 are bolts 128 screw threaded into the gear 116. These bolts are cylindrical throughout and have a diameter approximately equal to the minor axis of the slots 127 so as to serve merely as guide means permitting angular adjustment of the sleeve and the gear relative to one another. Extending through the slot 126 and screw threaded into the gear 116 is a bolt 129 which has formed thereon an eccentric portion 130 engaging the walls of the slot 126. At its exposed end the bolt 129 is formed with a squared or similarly shaped head 131 whereby the bolt may be rotated in one direction or the other for the purpose of limitedly rotating the sleeve and the gear relative to one another in either direction. The bolt carries a nut 132 for securing the bolt in adjusted position. Each gear 117 and gear 118 has, likewise, interposed between it and the shaft on which it is mounted a bushing or sleeve 133 which is nonrotatably secured to the shaft by means of a key 134 and is limitedly rotatable relative to its associated gear by means of the character just described for gear 116. The rotational or angular adjustment which may be effected in this way is in excess of one mesh of the fabric, giving universal adjustment.

Interposed between the gears 115 and 118, and 116 and 117, respectively, are idler gears 135 and 136. The gear 135 is in conventional manner nonrotatably secured as by means of a key 137 to a stub shaft 138 rotatably journaled in the bearings 34 and 44 formed in the uprights 30 and 31. Gear 136 is, similarly, nonrotatably secured in conventional manner as by a key 139 to a stub shaft 140 journaled in the bearings 36 and 46 supported by the uprights 30 and 31. The gears are of the same size and mesh respectively with the gears 115 and 118, and the gears 116 and 117, respectively, and with one another.

It is, of course, highly essential for the successful operation of this machine that the elements 25 and the elements 102 and 102' be very accurately timed and driven. To that end, there is rotatably mounted on each shaft 79, 82, 103, 104, 138 and 140, respectively, a backlash take-up gear 141, 142, 143, 144, 145 and 146, identical in construction with the drive gears mounted on those shafts. These take-up gears are secured to the corresponding drive gears for limited relative rotation only. To that end, each take-up gear is provided with three elongated slots 147, 148 and 149 spaced 120° apart. Of these slots, 147 is disposed with its major axis radially of the gear, while the major axis of each of the slots 148 and 149 is disposed tangential to a circle drawn through the centers of the three slots. Extending through slot 147 is a bolt 150 screw threaded into the drive gear and formed intermediate its ends with an eccentric portion 151. The remaining end of the bolt 150 is formed with a square or similarly shaped head 152 for the reception of a suitable wrench for turning the bolt. A nut 153 is provided for locking the eccentric bolt in adjusted position. Projecting through each of the slots 148 and 149 is a bolt 154 screw threaded for threading into the drive gear and serving as guides when the bolt 150 is rotated to effect relative angular adjustment between the backlash gear and its associated drive gear.

*Sheet conveying and guiding means*

Figure 2:
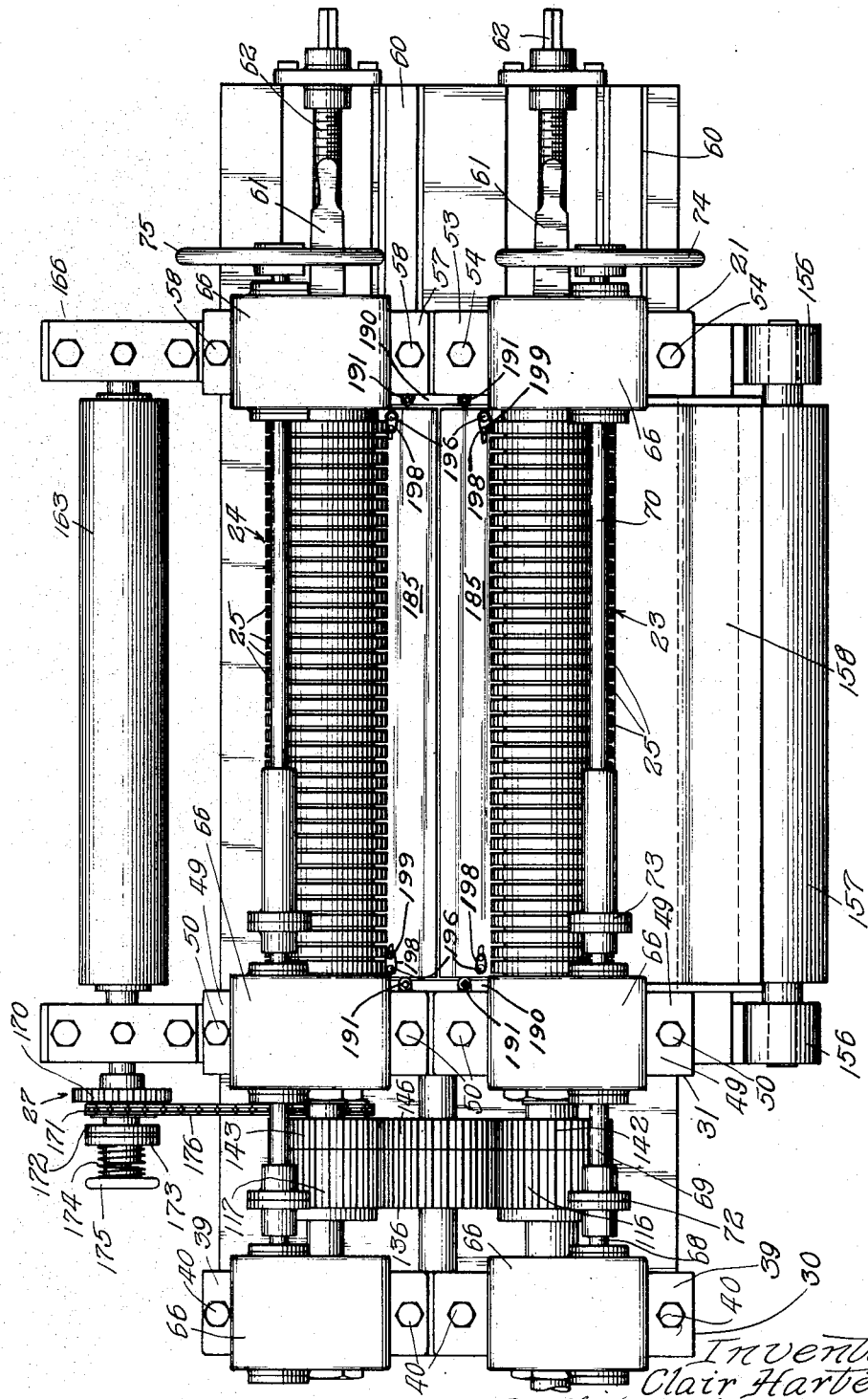
Fig. 2 is a top plan view of the machine of Fig. 1.

At the forward end of the machine, that is, at the bottom, as viewed in Fig. 2, and at the left-hand end, as viewed in Fig. 3, there is secured to the bed 19 a bracket 155 which has rotatably supported between ears 156 upstanding therefrom a roller 157 over which the solid sheet 86 is intended to pass as it is fed to the machine. Also carried by the bracket 155 is an apron or similar means 158 forming a guide for the sheet extending from the roller 157 to the cutting means 23. While the rate of feed of a sheet through the machine is determined by the rate of peripheral movement of the cutting means 23, and while the sheet is actually driven by the cutting means 23 and by the forming means 24, means is provided herein for aiding the cutting and the forming means in the feeding of the sheet and particularly for retaining the sheet under some tension as it passes through the machine. Herein this means comprises a pair of soft rubber rollers 162 and 163. These rollers are journaled respectively in a lower set of bearings 164 and an upper set of bearings 165 which are adjustable vertically, being guided for that purpose in a pair of upright columns 166 supported on a bracket 167. The bracket 167 is mounted on the rear of the bed 19 of the machine for vertical adjustment permitting it to have the position shown in Fig. 3 or lowered to the extent that the roller 163 would have the position which the roller 162 now has. The fabric could then be run back between the rollers to obtain added pull without high pressure between the rollers. Each of the bearings 164 and the bearings 165 are adjustable by screw drivers 168 and 169, respectively.

Preferably both of the rollers are driven, though one only would work satisfactorily, but they are not driven positively. To that end, there is rotatably mounted on a projecting end 170 of the shaft for each roller a sprocket wheel 171 (see Figs. 2 and 4). The sprocket wheel has formed thereon one element 172 of a friction clutch, the other element 173 of which is splined on the end 170 of the shaft so as to be nonrotatable relative thereto while free to move axially. Means including a compression spring 174 and an adjusting handwheel 175 are provided to determine the degree of frictional engagement between the two elements of the clutch and hence the tension which is applied to the sheet through the medium of the rollers 162 and 163. The sprocket 171 is driven by means of a chain 176 from a sprocket wheel 177 fast on the shaft 104, the ratio of the sprockets being such that the rollers tend to have a peripheral speed slightly greater than the rate at which the sheet is fed through the machine.

Means is provided primarily for guiding and centering and, secondarily, for supporting the sheet 86 in its passage from a point in advance of the engagement of the cutting means 23 with the sheet to a point beyond the final forming means 24. This means herein takes the form of a plurality of fingers or tines 180 in the form of elongated and flat slats or bars each of which, as best seen in Fig. 10, has one of its side edges slightly beveled at each end. The fingers 180 are disposed on edge and parallel with one another and extend longitudinally of the machine. Each of the fingers 180 is thin enough to project into the space left between the cutting or forming elements of the means 23 and 24, and are spaced laterally the same as the cutting and forming elements so as to project one into each of the spaces between the elements. Herein the fingers 180 are, for convenience and accuracy, divided into four groups 181, 182, 183 and 184. Each group of fingers is held in an elongated plate 185 extending transversely of the machine. The fingers 180 are received in slots formed in the plate 185 and in each instance are flush at one end with a side edge of the plate and at the other end project a substantial distance beyond a beveled edge 186 of the plate while the edge which is beveled at the ends projects a short distance beyond one face of the plate. As best seen in Fig. 10, the groups of fingers and their carrying plate are mounted in pairs, with the group 181 and 182 forming one pair in which the fingers extend toward the forward end of the machine and with the groups 183 and 184 constituting the other pair in which the fingers extend toward the rear end of the machine. In both pairs, the plates 185 are so mounted that the fingers of the one plate face the fingers of the other plate and are in vertical alignment.

The guide means as a whole is adjustable vertically and portions of the guide means are, moreover, individually adjustable to a limited extent so as to permit such positioning of the guide means that the sheet 86 will be held in the proper relationship to the cutting and forming means. To that end, there is rigidly secured to an upstanding portion 187, at each side of the bed 19, a block 188. Formed in each upstanding portion 187 are two sets of vertical guideways 189, one for each pair of the groups of fingers. Slidable in each guideway 189 is an L-shaped bracket 190 which is adapted to be adjusted vertically by means of a screw shaft 191 which is rotatable in but held against axial movement relative to a plate 192 bolted to the top of the upstanding portion 187. The screw shaft 191 has threaded engagement with the vertical leg of the L-shaped bracket so as to effect vertical adjustment of the bracket upon rotation of the screw shaft 191 in one direction or the other. Each of the brackets is provided with a pair of adjusting screws 193 which bear against the block 188 and are utilized accurately to determine the vertical position of the bracket 190, and hence of the means supported thereon, as well as to permit of limited adjustment of the plates 185 relative to the horizontal. In order that this may be accomplished, the brackets 190 have very slight play in the guideways 189.

The plates 185 of the lower groups of fingers, namely, 181 and 183, are supported at each end by the horizontal leg of the brackets 190 and are in fact securely held thereon by means of a single bolt 194 which extends through the plate and is threaded into the bracket 190. Supported on top of the lower group of fingers 181 is the group 182, the proper spacing of the edges of the fingers 180 being obtained by the interpositioning of a spacer strip 195 between the two plates 185. The upper plate 185 is properly located and held against horizontal displacement by means of a bolt 196 which passes through an aperture in the upper plate 185 and in the spacer strip 195 and is threaded into the lower plate 185. The apertures in the upper plate 185 and in the spacer strip are such that the bolt just passes therethrough and has a snug fit therein. Interposed between the upper plate 185 and the head of the bolt 196 is a compression spring 197 encircling the projecting portion of the bolt and serving to hold the upper plate 185 downwardly on the spacer strip with a predetermined amount of pressure adjustable by varying the extent to which the bolt 196 is threaded into the lower plate 185. As best seen in Fig. 10a, the fingers 180 of the groups 181 and 182 will be in registry and will be spaced by a distance approximately equal to the thickness of the sheet 86, and thus will guide and support the sheet in proper position relative to the cutting and forming elements. Each bolt 196 preferably has extending radially therefrom an arm 198 which carries a screw 199 serving as the adjustable but normally stationary contact of an electrical switch, the movable contact of which is formed by the upper plate 185. This switch may be utilized to control means for governing the machine in the event the sheet 86 should for some reason no longer lie absolutely flat but becomes bulged or buckled to an extent sufficient to raise the upper plate 185 a distance to make contact with the screw 199. It is to be understood that means of the character just described for yieldably holding the upper plate 185 in position and for detecting excess movement is provided at each end of each upper plate 185.

*Operation*

While it is believed that the operation of the machine is understood from the general statement as to the operation and the detailed description of the various parts of the machine, nevertheless it was felt that a brief summation of the operation might serve to crystallize the understanding of the invention. Before commencing operation of the machine, the attendant would first make the necessary adjustments so as to obtain a finished product of the character desired. To that end, as a first step the operator would arrange to have that number of elements 25, 102 and 102' composing the means 23 and 24, respectively, which are necessary to produce screen of the desired width. To that end, the attendant would first turn the handles 61 so as to release for lateral movement the columns 21 and 22 and, after removing any retaining nuts on the ends of the shafts 79, 82, 103 and 104, would shift the columns 21 and 22 to the right, as viewed in Fig. 1, through the medium of the screw shafts 62. Such shifting of the columns 21 and 22 would, of course, result in withdrawal of the shafts from the bearings carried by those columns and would permit removal of the retaining nuts 84 and removal or addition of such elements 25, 102 and 102' as would be necessary to produce the width of the screen desired. Inasmuch as the elements 25, 102 and 102' herein, together with their spacers, are one inch in axial dimension, screen material varying in width by units of one inch can readily be produced. After the appropriate number of cutting and forming elements are mounted on the shafts, the steps just described are reversed so as to restore the machine to operating condition.

As a further preliminary to actual operation of the machine, the attendant will adjust the parts 76 and 77 of the cutting and partial forming means 23 so as to bring about the cutting and, above all, the desired extent of twisting of the louver elements 88. Precisely timed engagement of the elements of the parts 76 and 77 with the sheet 86 is an essential under all conditions for proper slitting of the sheet. To achieve this condition, the attendant may adjust the elements of the upper part 77 angularly relative to the elements of the lower part 76 through the medium of the eccentric bolt 129 which adjusts the driving gear 116 relative to the shaft 82 and hence relative to the cutting and forming elements 25 mounted thereon, and the latter, in turn, relative to the cutting and forming elements on the lower shaft 79 since the shaft 79 is geared to the shaft 82. Any intermeshing of the elements of the means 23 beyond that necessary to effect the slitting of the sheet will, of course, effect a progressively greater twisting of the elements. Thus, by adjustment of the parts 76 and 77 toward or away from one another, the twist given to the elements 88 by these parts may be varied. The attendant, therefore, will adjust the parts so as to obtain the desired twist which is to be given to the louver elements by the means 23. This is herein readily effected simply by manipulation of the handwheel 74 which, through the mechanism described, raises or lowers all of the bearings in which the shaft 82 is journaled simultaneously and in a direction dependent upon the direction of rotation of the handwheel 74.

The attendant adjusts the means 24 so as to give to the louver elements 88 the amount of twist necessary to have them form a desired angle with the plane of the sheet in its finished state. Here again the attendant can rotate the elements 102 relative to the elements 102' through the medium of an eccentric bolt 129 by means of which the drive gear 117 is coupled to the shaft 103, and the entire shaft 103, and hence the elements 102 thereon, can be raised or lowered relative to the shaft 104 and the elements thereon by means of the handwheel 75. As above described at greater length, a great variety of factors enter into the amount of twist that will be given to the louver elements 88 by the final forming means 24, including the relative positions that the elements 102 and 102' have at the time of disengagement from the screen and the extent of intermeshing of the elements with the screen. By whatever means or adjustment the attendant accomplishes the desired twisting of the louver elements by the means 24, one essential is that the elements 102 and 102' disengage from the finished screen fabric simultaneously. If the adjustments are not so made that this occurs, the finished screen material will have a tendency to be carried around by the elements last to disengage, with resultant unsatisfactory operation of the machine.

Finally the attendant adjusts the guide means composed of the fingers 180. This involves first a vertical adjustment of the means as a whole so as to support the sheet in position spaced midway between the upper and lower parts of each the cutting and the forming means 23 and 24. It also involves the proper spacing of the upper one of each pair of groups of fingers 180 relative to the lower group of fingers, for the firmness with which the sheet is held as it is operated upon by the means 23 and 24 has some bearing on the effect of such operations on the longitudinally extending supporting strips of the finished screen. If firmly held, these strips remain substantially flat the same as the original sheet from which the screen material is formed. If less firmly held, the supporting strip is given a very slight undulatory or wave form. In some instances, the latter formation is desirable because it tends, first, to stiffen the supporting strips, while at the same time adding a degree of resiliency to the finished screen material.

It is to be appreciated, of course, that, in addition to the adjustments above described, the machine may be supplied with a completely different set of cutting and forming elements for producing recticular material of different mesh or with louver elements of different length. Further, by proper formation of the keyways in alternate elements, the machine may be adapted to produce screen or other material in which the slits are in alignment transversely of the sheet or in which slits in alternate columns may be offset varying amounts. It is also to be appreciated that, by change in the size of the forming elements or by change in the drive gearing, the relative peripheral speeds of the various elements may be varied with resultant great differences in the results obtained.

After the above various adjustments have been made, the attendant starts the machine in operation and feeds the end of a continuous sheet of material of appropriate dimensions and characteristics to the cutting and partial forming means 23. For the most part, this material will probably be one of the metals, but the machine will operate upon any material capable of taking and retaining a set. The means 23 will then first slit and also partially form a twist in the louver elements 88 as the sheet is fed between the elements 25 composing the means 23. Once the sheet is engaged by the means 23, the attendant need no longer feed the same, but the sheet will thereafter be fed to the machine by the means 23 and its rate of feed will be determined by the peripheral speed of the elements 25. The slit and thus partially formed sheet then passes through the fingered guide means and to the final forming means 24. This means intermeshes with the partially formed screen and twists the louver elements through the remaining angle so as to have them properly disposed at the time that the elements 102 and 102' disengage from the screen. From the means 24 the finished screen passes through the rollers 162 and 163 which are so driven as to maintain the screen under some tension, and from these rollers the screen is led to a winding roll upon which the finished screen is wound. Once the sheet of material is thus completely fed through the machine, the operation continues with the sheet traveling at a continuous and uniform rate. The capacity of the machine thus is very high, for there are no reciprocatory parts that might place limitations on the speed of operation and, further, the capacity is large because the screen is formed from a solid sheet which fact, coupled with the character of the machine, enables production of screen at a rate very greatly in excess of weaving machines.

The term "solid sheet" is employed herein to designate a sheet that has by far the greater percentage of its original material as distinguished from a sheet that has large areas cut out for the purpose of giving it an open-work or mesh effect. The term, however, is not intended to exclude sheets that have been perforated to a moderate degree, for example, with perforations that form the ends of the slits that are cut into the sheet by the machine herein disclosed.

I claim as my invention:

1. In a cutting and forming machine for producing a mesh fabric from a sheet, a first means operable as a sheet is fed through the machine to cut in the sheet a regular pattern of slits extending generally transversely of the direction of feed of the sheet and to displace the sheet at each slit in opposite directions out of the plane of the sheet, a second means operable upon the sheet after it has been slit comprising a pair of parts between which the slit sheet is received, each of the parts having projections thereon for engaging the sheet at the edges formed by the slits therein and mounted for movement of the projections while in engagement with the sheet in a path approximately parallel with the path of the sheet, and means for actuating said first and said second means with the parts of said second means while in engagement with the sheet having a linear speed of their respective projections different from the linear speed of movement of the sheet as a whole and different from the linear speed of the projections of the other part.

2. In a cutting and forming machine for producing a mesh fabric from a sheet, a first means operable as a sheet is fed through the machine to cut in the sheet a regular pattern of slits extending generally transversely of the direction of feed of the sheet and to displace the sheet at each slit in opposite directions out of the plane of the sheet, a second means operable upon the sheet after it has been slit comprising a pair of parts between which the slit sheet is received, each of the parts having projections thereon for engaging the sheet at the edges formed by the slits therein and mounted for movement of the projections while in engagement with the sheet in a path approximately parallel with the path of the sheet, and means for actuating said first and said second means with the parts of said second means while in engagement with the sheet having a linear speed of their respective projections different from one another.

3. In a cutting and forming machine for producing a mesh fabric from a sheet, a first means operable as a sheet is fed through the machine to cut in the sheet a regular pattern of slits extending generally transversely of the direction of feed of the sheet and to displace the sheet at each slit in opposite directions out of the plane of the sheet, a second means operable upon the sheet after it has been slit and displaced at the edges formed by a slit comprising a pair of parts between which the slit sheet is received, each of the parts having projections thereon for engaging the slits in the sheet and mounted for movement of the projections while in engagement with the sheet in a path approximately parallel with the path of the sheet, and means for actuating said first and said second means with one of the parts of said second means while in engagement with elements of the sheet having a linear speed of its projections greater than the linear speed of movement of the sheet at said second means.

4. In a cutting and forming machine for producing a mesh fabric from a sheet: a first mechanism operable to feed a sheet through the machine at a continuous and uniform linear rate, to cut in the sheet a regular pattern of slits extending transversely of the sheet and to displace the sheet at each slit in opposite directions out of the plane of the sheet; a second mechanism for acting upon the sheet after it has been slit and displaced at the edges formed by a slit operable while the sheet moves continuously at a uniform rate to impart additional displacement uniformly to each half of each lower element to complete the conversion of the sheet into an open-mesh fabric; and means for actuating said first and said second mechanisms in coordinated relationship.

5. In a cutting and forming machine for producing a mesh fabric from a sheet, a first means operable as a sheet is fed through the machine to cut in the sheet a regular pattern of slits and to displace the sheet at each slit in opposite directions out of the plane of the sheet, a second means operable upon the sheet after it has been slit and displaced at the edges formed by a slit comprising a pair of parts between which the slit sheet is received, each of the parts having projections thereon for engaging the slits in the sheet and each of the parts being mounted for movement of its projections in the direction of feed of the sheet while in engagement with the sheet, and means for actuating said first means and said second means in timed relationship with at least one of the parts of said second means being actuated so that its projections have a linear rate of movement different from that of the sheet while in engagement with the elements formed by the slitting of the sheet.

6. In a cutting and forming machine for producing a mesh fabric from a sheet, a first means operable as a sheet is fed through the machine to cut in the sheet a regular pattern of slits and to displace the sheet at each slit in opposite directions out of the plane of the sheet, a second means operable upon the sheet after it has been slit comprising a pair of parts between which the slit sheet is received, each of the parts having projections thereon for engaging the sheet at the edges formed by the slits therein and each of the parts being mounted for movement of its projections in the direction of feed of the sheet while in engagement with the sheet, and means for actuating said first means and said second means in timed relationship with at least one of the parts of said second means being actuated so that its projections have a linear rate of movement greater than that of the sheet while in engagement with the elements formed by the slitting of the sheet.

7. In a machine for producing louvered fabric from a sheet, a first means for slitting a sheet to form a regular pattern of elongated louver elements and partially rotating each louver element about its longitudinal center line out of the plane of the sheet, a second means comprising a pair of complementary parts between which the partially formed fabric is received, each of the parts having projections thereon for engaging each of the louver elements intermediate its points of attachment to the sheet and each of the parts being mounted for movement of its projections in a direction transversely of the louver elements formed in the sheet, and means for driving the parts of the second means at relatively different speeds and in such coordinated, timed relationship that the parts during engagement with a louver element tend to rotate the louver element in the same direction about its longitudinal center line and in the same direction of partial rotation effected by said first means.

8. In a machine for producing louvered fabric from a sheet, a first means operable to cut slits into a sheet to form a regular pattern of elongated louver elements extending transversely of the sheet and to rotate each louver element about its longitudinal center line out of the plane of the sheet, said means being adapted to effect continuous feed of the sheet through the machine, a second means comprising a pair of complementary parts between which the partially formed fabric passes as it is fed through the machine, each of the parts having projections thereon for engaging each of the louver elements and each of the parts being mounted for movement of its projections in the direction of movement of the sheet, and means for driving the parts of said second means in coordinated relationship with the feed of the sheet, the projections on one part while in engagement with the sheet having a linear speed greater than the rate of movement of the sheet, and the projections on the other part while in engagement with the sheet having a linear speed less than the rate of movement of the sheet.

9. In a machine for producing louvered fabric from a sheet, a first rotary means operable to cut slits into a sheet to form a regular pattern of elongated louver elements extending transversely of the sheet and to rotate each louver element about its longitudinal center line out of the plane of the sheet, said means upon rotation effecting continuous feed of the sheet through the machine, a second rotary means comprising a pair of complementary parts between which the partially formed fabric passes as it is fed through the machine, each of the parts having projections thereon for engaging each of the louver elements and each of the parts being mounted for movement of its projections in the direction of movement of the sheet, and means for driving the parts of said second means in coordinated relationship with the feed of the sheet, the projections on one part while in engagement with the sheet having a linear speed greater than the rate of movement of the sheet, and the projections on the other part while in engagement with the sheet having a linear speed less than the rate of movement of the sheet.

10. In a machine for producing louvered fabric from a sheet, a first means composed of a pair of cooperating rotary parts operable to cut slits into a sheet to form a regular pattern of elongated louver elements extending transversely of the sheet and to rotate each louver element about its longitudinal center line out of the plane of the sheet, said means upon rotation of its parts effecting continuous feed of the sheet through the machine, a second means comprising a pair of rotary cooperable parts between which the partially formed fabric passes as it is fed through the machine, each of the parts of said second means being mounted on an axis parallel with the axis of the parts of said first means and having projections thereon for engaging each of the louver elements on the side of the sheet adjacent the part, and means for driving the parts of said second means in coordinated relationship with the feed of the sheet but with the projections on one part while in engagement with the sheet having a peripheral speed greater than the rate of movement of the sheet by the same amount that the peripheral speed of the projections on the other part of said second means is less than the rate of movement of the sheet.

11. In a machine for producing louvered fabric from a sheet: a sheet-slitting and sheet-feeding means comprising a pair of toothed rotary parts cooperable upon rotation to cut slits into a sheet to form a regular pattern of elongated louver elements extending transversely of the sheet, to displace the edges of each louver element in opposite directions out of the plane of the sheet and to effect continuous feed of the sheet through the machine; a second means comprising a pair of toothed rotary parts cooperable as the partially formed fabric passes therebetween to engage each louver element and twist it about its longitudinal center line to dispose it at an angle to the plane of the sheet, the teeth on one of the parts of said second means having a circular pitch greater than the pitch of the fabric and the teeth on the other part of said second means having a circular pitch less than the pitch of the fabric; and means for driving both means in coordinated timed relationship but with the part of said second means having the greater circular pitch at a higher peripheral speed than the linear speed of the fabric and with the part of said second means having the smaller circular pitch at a lesser peripheral speed than the linear speed of the fabric.

12. In a machine for producing louvered fabric from a sheet: a sheet-slitting and sheet-feeding means comprising a pair of toothed rotary parts cooperable upon rotation to cut slits into a sheet to form a regular pattern of elongated louver elements extending transversely of the sheet, to displace the edges of each louver element in opposite directions out of the plane of the sheet and to effect continuous feed of the sheet through the machine; a second means comprising a pair of toothed rotary parts cooperable as the partially formed fabric passes therebetween to engage each louver element and twist it about its longitudinal center line to dispose it at an angle to the plane of the sheet; and means for driving the parts of said second means in coordinated timed relationship with said first means, the parts of said second means having a circular pitch of the teeth and a peripheral speed such that a tooth on each part meshes with a louver element of the fabric and remains meshed with that particular element while having a linear speed differential between it and the sheet to effect rotation of the louver element about its longitudinal center line.

13. In a machine for producing louvered fabric from a sheet: a sheet-slitting and sheet-feeding means comprising a pair of toothed rotary parts cooperable upon rotation to cut slits into a sheet to form a regular pattern of elongated louver elements extending transversely of the sheet, to displace the edges of each louver element in opposite directions out of the plane of the sheet and to effect continuous feed of the sheet through the machine, the parts having substantially the same diameter and the same circular pitch of the teeth; a second means comprising a pair of toothed rotary parts cooperable as the partially formed fabric passes therebetween to engage each louver element and twist it about its longitudinal center line to dispose it at an angle to the plane of the sheet, the circular pitch of the teeth on one of the parts and the pitch diameter being larger than the circular pitch of the teeth and the pitch diameter of the other part; and means for driving all the parts at the same angular rate.

14. In a machine for producing louvered fabric from a sheet: a sheet-slitting and sheet-feeding means comprising a pair of toothed rotary parts cooperable upon rotation to cut slits into a sheet to form a regular pattern of elongated louver elements extending transversely of the sheet, to displace the edges of each louver element in opposite directions out of the plane of the sheet and to effect continuous feed of the sheet through the machine, the parts having substantially the same diameter and the same circular pitch of the teeth; a second means comprising a pair of toothed rotary parts cooperable as the partially formed fabric passes therebetween to engage each louver element and twist it about its longitudinal center line to dispose it at an angle to the plane of the sheet, the circular pitch of the teeth of one of the parts of said second means being larger and the pitch diameter being larger than the circular pitch and the pitch diameter of the parts of the first means, and the circular pitch and the pitch diameter of the other part of said second means being smaller than the circular pitch and the pitch diameter of the parts of said first means; and means for driving all of the parts to have the same angular rate.

15. In a machine for producing louvered fabric from a sheet: a sheet-slitting and sheet-feeding means comprising a pair of toothed rotary parts cooperable upon rotation to cut slits into a sheet to form a regular pattern of elongated louver elements extending transversely of the sheet, to displace the edges of each louver element in opposite directions out of the plane of the sheet and to effect continuous feed of the sheet through the machine; a second means comprising a pair of toothed rotary parts mounted on axes parallel with the parts of said first means, one of the parts of said second means engaging the trailing edge of each louver element and the other part of said second means engaging the leading edge of each louver element as the fabric passes between the parts; and means for driving the part of said second means engaging the trailing edge of the louver element to have a peripheral speed greater than that of the fabric and for driving the part of said second means engaging the leading edge of the louver elements to have a peripheral speed less than that of the fabric, the parts of said second means having a circular pitch and a pitch diameter such that at the peripheral speeds at which they are driven each part will engage each louver element and while in engagement will rotate each louver element through a desired angle.

16. In a machine for producing louvered fabric from a sheet, cutting means for slitting a sheet to form a plurality of elongated louver elements and for partially twisting each element about its longitudinal center line to cause the same to lie at an angle to the plane of the sheet comprising a pair of complementary parts between which the sheet is passed, each of the parts being composed of a plurality of elements, each of the elements being composed of cutting teeth each having a width substantially equal to the desired length of the louver elements and the number of elements composing each part being variable to be operable upon sheets of varying width.

17. In a machine for producing louvered fabric from a sheet, means for slitting a sheet to form a plurality of elongated louver elements and for partially twisting each element about its longitudinal center line to cause the same to lie at an angle to the plane of the sheet comprising a pair of complementary parts between which the sheet is passed, each of the parts being composed of a plurality of toothed elements, each of the elements having a width substantially equal to the desired length of the louver elements, and means for varying the extent of intermeshing of the elements of one part with the elements of the other part to vary the extent of twist imparted to the louver elements by said means.

18. In a machine for producing louvered fabric from a sheet, means for slitting a sheet to form longitudinally extending columns of narrow transversely extending louver elements and for partially twisting each louver element about its longitudinal center line out of the plane of the sheet comprising a pair of cooperating rotary parts mounted on parallel axes, each part being composed of a plurality of circular toothed elements with the elements spaced axially at regular intervals to leave a longitudinally extending uncut strip in the sheet dividing the louver elements into columns, each tooth of each element having a cutting edge face undercut to form a small angle with a truly radial plane intersecting the face and a backing face forming a substantial angle with a truly radial plane intersecting the backing face, the elements of one part being reversed with respect to the elements of the other part in order that the cutting edge face of the teeth is the leading face in one part and the lagging face in the other part.

19. In a machine for producing louvered fabric from a sheet, means for slitting a sheet to form longitudinally extending columns of narrow transversely extending louver elements and for providing each louver element with a flange along at least one longitudinal edge to strengthen the louver element against bending comprising a pair of cooperating rotary parts mounted on parallel axes, each part being composed of a plurality of circular toothed elements, each tooth of each element having a cutting edge face and a backing face, the cutting edge face of the teeth on the elements forming one of the parts being undercut and the teeth of the elements forming the other part having a peripheral face of a width corresponding to the width of the flange to be formed along a longitudinal edge of each louver element, the elements of one part being reversed with respect to the elements of the other part, and the elements having the teeth with a peripheral face mounted so that the cutting edge face is the trailing face.

20. In a machine for producing louvered fabric from a sheet, means for slitting a sheet to form longitudinally extending columns of narrow transversely extending louver elements and for providing each louver element with a flange along at least one longitudinal edge to strengthen the louver element against bending comprising a pair of cooperating rotary parts mounted on parallel axes, each part being composed of a plurality of circular toothed elements, each tooth of each element having a cutting edge face, a backing face and a peripheral face of a width corresponding to the width of the flange to be formed on the longitudinal edges of each louver element, the elements constituting one of the parts being reversed from the elements constituting the other of the parts so that the cutting edge face of the teeth is the leading face in one of the parts and the lagging face in the other of the parts, and the peripheral face of the teeth in which the cutting edge face is the leading face sloping radially outwardly from the cutting edge to the backing face.

21. In a machine for producing louvered fabric, means for feeding a louvered fabric having transversely extending louver elements partially rotated out of the plane of the sheet at a continuous rate through the machine, means for imparting further rotation to each of the louver elements comprising a pair of cooperating rotary parts mounted on parallel axes disposed transversely of the direction of feed of the fabric on either side of the fabric and having peripheral tooth-like projections adapted to engage the longitudinal edges of each louver element and means for positively driving both parts, the one to have a peripheral speed greater than the rate of movement of the fabric and the other to have a peripheral speed less than the rate of movement of the fabric.

22. In a machine for producing louvered fabric, means for feeding a louvered fabric having transversely extending louver elements partially rotated out of the plane of the sheet at a continuous rate through the machine, means for imparting further rotation to each of the louver elements comprising a pair of cooperating rotary parts mounted on parallel axes disposed transversely of the direction of feed of the fabric on either side of the fabric and having peripheral tooth-like projections adapted to engage the longitudinal edges of each louver element, means for positively driving both parts, the one to have a peripheral speed greater than the rate of movement of the fabric and the other to have a peripheral speed less than the rate of movement of the fabric, and means in the drive for at least one of said parts for adjusting the angular relationship of said parts to have simultaneous disengagement of the parts from the louver elements, each of said parts having a circular pitch of its tooth-like projections such that a tooth-like projection of the part having the greater peripheral speed will intermesh with each louver element of the fabric lagging the element by the linear differential between said part and the fabric of distance traveled during intermeshing of said part with the fabric, and such that the tooth-like projection of the part having the lesser peripheral speed will intermesh with each louver element leading the element by the linear differential between said part and the fabric of distance traveled during intermeshing of said part with the fabric.

23. In a machine for producing louvered fabric, means for feeding a louvered fabric having transversely extending louver elements partially rotated out of the plane of the sheet at a continuous rate through the machine, means for imparting further rotation to each of the louver elements comprising a pair of cooperating rotary parts mounted on parallel axes disposed transversely of the direction of feed of the fabric on either side of the fabric and having peripheral tooth-like projections adapted to engage the longitudinal edges of each louver element, means for positively driving both parts, the one to have a peripheral speed greater than the rate of movement of the fabric and the other to have a peripheral speed less than the rate of movement of the fabric, and means in the drive for at least one of said parts for adjusting the angular relationship of said parts to have simultaneous disengagement of the parts from the louver elements, and means for adjusting said parts laterally toward or from one another.

24. In a machine for producing louvered fabric, means for feeding a louvered fabric having transversely extending louver elements displaced out of the plane of the sheet at a continuous rate through the machine, means for imparting further displacement to each of the louver elements comprising a pair of cooperating rotary parts mounted on parallel axes disposed transversely of the direction of feed of the fabric on either side of the fabric, each of said rotary parts having peripheral discontinuous tooth-like projections adapted individually to engage one of the longitudinal edges of each louver element, and means for positively driving each of said parts to have a peripheral speed different from the rate of movement of the fabric.

25. In a cutting and forming machine for producing a mesh fabric from a sheet, a first means operable as a sheet is fed through the machine to cut in the sheet a regular pattern of slits extending generally transversely of the direction of feed of the sheet and to displace the sheet at each slit in opposite directions out of the plane of the sheet, a second means operable upon the sheet after it has been slit and displaced at the edges formed by a slit comprising a pair of parts between which the slit sheet is received, each of the parts being adapted to engage the sheet at the edges formed by the slits therein and mounted for movement of its sheet engaging portion, while in engagement with the sheet, in a path approximately parallel with that of the sheet, means for actuating said first means, and means for actuating at least one part of said second means to have a linear speed of its sheet engaging portion, while in engagement with edges formed by the slits in the sheet, different from the linear speed of movement of the sheet at said second means.

26. In a cutting and forming machine for producing a mesh fabric from a sheet, a first means operable as a sheet is fed through the machine to cut in the sheet a regular pattern of slits extending generally transversely of the direction of feed of the sheet and to displace the sheet at each slit in opposite directions out of the plane of the sheet, a second means operable upon the sheet after it has been slit and displaced at the edges formed by a slit comprising a pair of parts between which the slit sheet is received, each of the parts being adapted for engaging the sheet at the edges formed by the slits therein and mounted for movement of its sheet engaging portion while in engagement with the sheet in a path approximately parallel with the path of the sheet, and means for actuating said first and said second means to impart to the parts of said second means relatively different linear speeds of the sheet engaging portions thereof.

27. The cutting and forming machine of claim 25, in which both parts of the second means are mounted for movement, with the one part having a speed of its sheet engaging portion, while in engagement with the sheet, greater than that of the sheet, and the other part a speed of movement less than that of the sheet.

28. The cutting and forming machine of claim 25, in which both parts of the second means are mounted for movement with the parts having relatively different speeds and speeds different from that of the sheet.

CLAIR HARTER.

REFERENCES CITED

The following references are of record in the file of this patent:

UNITED STATES PATENTS

| Number | Name | Date |
|---|---|---|
| 409,095 | Behr | Aug. 13, 1889 |
| 767,883 | Grafton | Aug. 16, 1904 |
| 804,799 | Edison | Nov. 14, 1905 |
| 1,053,614 | Layne | Feb. 18, 1913 |
| 1,210,848 | Scammell | Jan. 2, 1917 |
| 1,236,465 | Mathias | Aug. 14, 1917 |
| 1,454,594 | Angle | May 8, 1923 |
| 1,542,424 | Townsend | June 16, 1925 |
| 1,545,191 | Lentz | July 7, 1925 |
| 1,677,438 | Frohnhauser | July 17, 1928 |
| 1,691,408 | Palmer | Nov. 13, 1928 |
| 1,814,867 | Swift | July 14, 1931 |
| 1,912,681 | Baker | June 6, 1933 |
| 2,000,208 | Balfe | May 7, 1935 |
| 2,089,326 | Bailey | Aug. 10, 1937 |
| 2,250,593 | Mesnel | July 29, 1941 |
| 2,352,194 | Grabec | June 27, 1944 |
| 2,366,224 | Warp | Jan. 2, 1945 |
| 2,492,909 | Warp | Dec. 27, 1949 |